Aug. 12, 1969     C. M. PEASLEY     3,460,779

CORD HOLDER AND STORAGE DEVICE

Filed July 14, 1967

Curtiss M. Peasley
Inventor
by Lawrence F. Benjamin
Attorney

United States Patent Office 3,460,779
Patented Aug. 12, 1969

3,460,779
CORD HOLDER AND STORAGE DEVICE
Curtiss M. Peasley, W. Medford, Mass.
(25 Boulder Drive, Burlington, Mass. 01803)
Filed July 14, 1967, Ser. No. 653,471
Int. Cl. B65h 75/36
U.S. Cl. 242—85.1                                                 1 Claim

ABSTRACT OF THE DISCLOSURE

A device for shortening and storing the excess lengths of electrical line cord, between an electrical appliance and the electrical plug at the end thereof wherein the line cord is first looped through the central bore of a hollow core, wound about the outside of the core and then secured to the core by running the free end through the previously formed loop. The device is further provided with a cover for the wire and with end covers to secure the device against dust.

BACKGROUND OF THE INVENTION

This invention relates to the storage of flexible cords and particularly a storage device for concealing and storing excessive lengths of flexible power leads for electrical appliances.

Storage devices and holders for electrical power and extension line cords have wide use both in industry and in households. In particular, there are instances where the appliance is of a portable nature and must be moved from one location to another and located at varying distances from the convenience outlet from which electrical power is derived. As a result, the user is reluctant to physically excise or shorten the cord because of the attendant inconvenience and because the future needs of the appliance may require a longer cord. However, with the longer cord the excess length becomes a problem to store and invariably becomes a collector of dust. To merely allow the cord to lie on the floor in a random configuration, exposed to the atmosphere, provides a serious electrical hazard should other equipment be rolled over it thereby twisting the insulation and short-circuiting the cord. It is further noted that to leave the wire exposed to the atmosphere increases the rate of deterioration of the exposed insulation and, in instances of high traffic, the insulation has been known to crack and peel off in short order. In addition should the cord be allowed to lie on the floor in random fashion, there is nothing to prevent it from becoming snarled in and easily entangled with the legs or the support of the appliance.

To merely coil the line cord and tape or tie the loops would still not adequately solve the problem because this would merely produce an awkward, bulky mass that would be both unsightly and unmanageable because of its bulk. In any event coiling the line cord and taping the coil loops together would still allow the end loops of the coil to be drawn out and become tightened adjacent to the end, making the future unwinding difficult without first disconnecting the appliance and unsnarling the line cord.

SUMMARY OF THE INVENTION

In my device, an essentially hollow, cylindrical core is provided with a single longitudinal slot or notch at each end thereof to accept the line cord. The cord is first formed into a single loop and the loop is passed through the center of the core so that only a small portion thereof extends beyond the farthest end. Thereafter, one end of the excess line cord (the cord to be wound) is first placed in one end notch and wound neatly along the outer surface of the core toward the exposed loop portion to form a tight coil about the core. When a sufficient length of line cord has been wound on the core, the free end is then threaded into the notch at the loop end of the core and then through the exposed portion of the loop. The free ends of the line cord are then pulled taut and any further movement thereof is prevented by reason of the fact that those portions of the cord immediately adjacent the notches are locked, one against the other.

A coil cover is provided which fits snuggly over the coil of wire wound on the core, to protect it from damage and end covers are provided to keep dust out of my device.

It is therefore a principal object of the present invention to provide a storaged evice for concealing and neatly storing the power cord for an electric appliance.

Another principal object of the present invention is to provide a storage device for concealing and neatly storing the power cord for an electric appliance noted by the fact that any unwanted lengthening of the cord is prevented by locking one portion of the cord against another.

Still another principal object of the present invention is to provide a novel storage device for concealing and neatly storing the power cord for an electrical appliance noted by the absence of sharp corners for the prevention of lengthening of the wire.

The features of my invention which I believe to be novel are set forth with particularity in the appended claims. My invention itself, however, both as to its organization and method of operation, together with further objects and advantages thereof, may be best understood by reference to the following description taken in conjunction with the following drawings.

DESCRIPTION OF THE PREFERRED EMBODIMENTS

Figure 1:
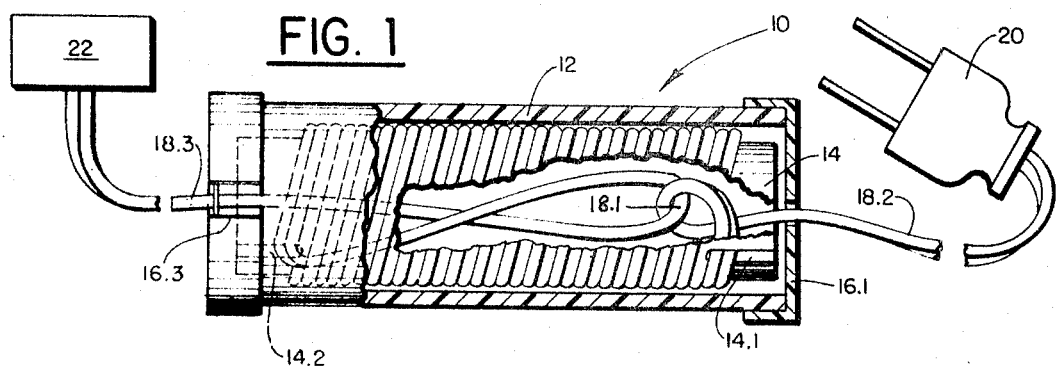
FIG. 1 is a plan view, partially in section, of my assembled device.

Referring now to FIG. 1 there is shown my novel line cord holder and storage device 10 consisting of outer cover 12, the winding core 14, and covers 16.1 and 16.2 with a line cord consisting of portions 18.1, 18.2 and 18.3 wound thereon to form coil 18. Plug 20 is connected to one end of the line cord while the appliance or utilization device 22 is connected to the other end thereof.

Figure 2:
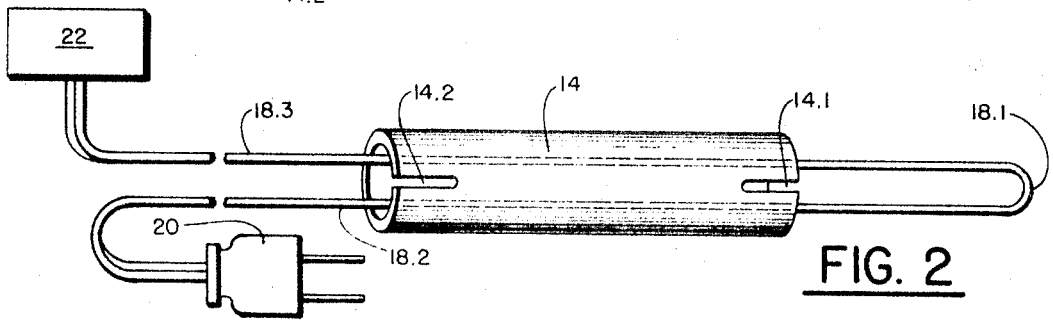
FIG. 2 is an isometric view of my winding core showing the start of the winding process.
Figure 3:
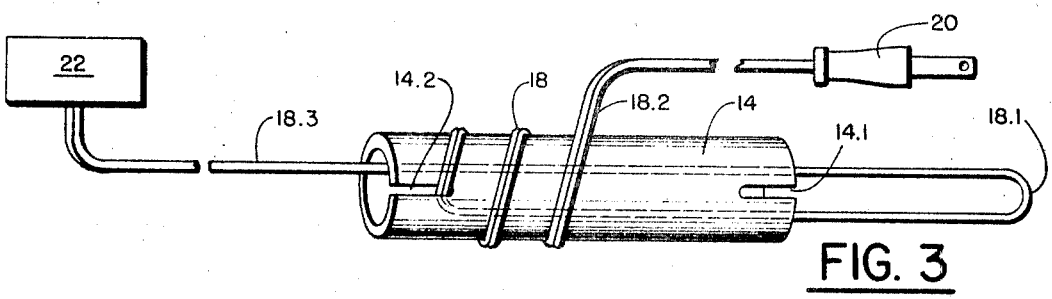
FIG. 3 is an isometric view of the core showing the line or power cord partially wound thereon.

Referring now to FIGS. 2 and 3 there is shown an isometric view of winding core 14 indicating how the guide slots or notches 14.1 and 14.2 are disposed at the respective ends of the hollow winding core 14 to guide the line cord into the central bore. The line cord is shown partially wound about core 14 to form coil 18.

Figure 4:
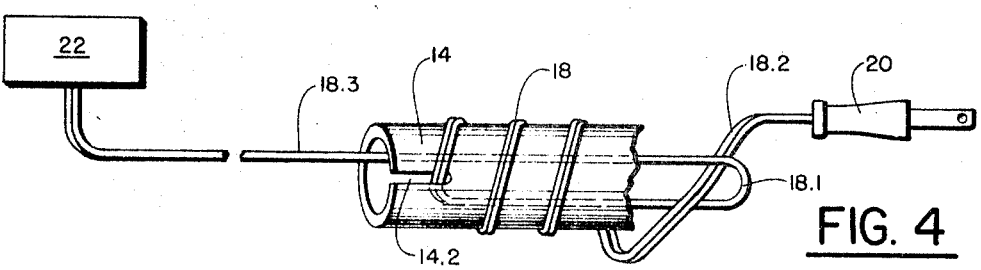
FIG. 4 is an isometric view of the wound core showing how the free end of the line cord is placed through the loop wherein one end of the wire works against the other end to prevent any unwanted unwinding of the line cord.

Referring now to FIG. 4 it will be seen that the line cord is wound about core 14 to form coil 18 and when the overall appropriate or desired length of line cord remains between the plug 20 and appliance 22, plug 20 is passed through loop 18.1 and is affixed in place when tension is applied to portions 18.2 and 18.3.

Thus, to utilize my device reference is made to FIGS. 2, 3 and 4 wherein a line cord, consisting of portions 18.2 and 18.3, is doubled back on each other to form loop portion 18.1. The next step requires that loop portion 18.1 be passed through the hollow central bore of winding core 14. Thereafter, line cord portion 18.2 is engaged with guide slot or notch 14.2. Line cord portion 18.2 is then wound about the outer circumference of winding core 14 to form coil 18 thereon and, when overall length of line cord remains or when the desired length of line cord has been achieved, line cord portion 18.2 is then engaged with guide slot or notch 14.1 located at the opposite end of winding core 14. Thereafter, plug 20 is made to pass through the previously formed loop portion 18.1 and the length of line cord is locked against any further movement by pulling simultaneously on line cord portions 18.2 and 18.3.

To complete the device, reference is again made to FIG. 1 wherein it is shown how cover 12 has been passed over plug 20 and along the length of line cord portion 18.2 until it is located directly above and covers both winding core 14 and coil 18. Thereafter, the end covers 16.1 and 16.2, having slots 16.3, are fitted over line cord portions 18.2 and 18.3 respectively and then pressed over the ends of cover 12 to seal coil 18 from the entry of dust therein.

While I have described what is presently considered the preferred embodiment of my invention, it will be obvious to those skilled in the art, that various other changes and modifications may be made thereon without departing from the inventive concept contained therein.

What is claimed is:

1. A device for the storage of excess lengths of electrical power cords, comprising:
   a cylindrical winding core upon which the excess lengths of power cord is radially wound and stored; the core having a central bore extending along the longitudinal axis thereof;
   a cylindrical, hollow cover member disposed about and complementary to the winding core;
   a pair of circular dust covers for mating with the ends of the cover member;
   the dust covers having a flat, cylindrical, aperture disc-shaped end portion, a flange portion normal to the plane of the flat end portion extending around the periphery thereof and a slotted portion extending from the aperture across the flat end portion and across the flange portion; and
   notch means disposed in and extending through only one portion of the wall of the winding core solely at each end thereof, for guiding a pair of portions of the power cord into the central bore of the winding core and for maintaining both portions of the power cord within the central bore.

References Cited

UNITED STATES PATENTS

| | | | |
|---|---|---|---|
| 225,437 | 3/1880 | Terrell et al. | 242—137 X |
| 1,256,443 | 2/1918 | Demmien | 242—137 X |
| 2,533,341 | 12/1950 | Alfano | 242—85.1 |
| 2,587,707 | 3/1952 | Dever | 242—85.1 |
| 3,337,682 | 8/1967 | Swett | 242—85.1 X |

OTHER REFERENCES

Popular Mechanics, June 1944, page 95.

NATHAN L. MINTZ, Primary Examiner